United States Patent
Ishizaki et al.

(10) Patent No.: US 8,864,228 B2
(45) Date of Patent: Oct. 21, 2014

(54) VEHICLE SEAT

(75) Inventors: Keisuke Ishizaki, Nishio (JP); Manabu Ishimoto, Chiryu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 410 days.

(21) Appl. No.: 13/146,722

(22) PCT Filed: Jan. 5, 2010

(86) PCT No.: PCT/JP2010/050036
§ 371 (c)(1),
(2), (4) Date: Jul. 28, 2011

(87) PCT Pub. No.: WO2011/083566
PCT Pub. Date: Jul. 14, 2011

(65) Prior Publication Data
US 2011/0285185 A1    Nov. 24, 2011

(51) Int. Cl.
*B60N 2/42*    (2006.01)
*B60N 2/427*    (2006.01)
*B60N 2/48*    (2006.01)

(52) U.S. Cl.
CPC ............ *B60N 2/4221* (2013.01); *B60N 2/4228* (2013.01); *B60N 2/427* (2013.01); *B60N 2/4885* (2013.01)
USPC .................................................. 297/216.14

(58) Field of Classification Search
USPC .................. 297/216.14, 216.13, 216.1, 284.4, 297/301.1, 452.37
See application file for complete search history.

(56) References Cited

U.S. PATENT DOCUMENTS

| | | | |
|---|---|---|---|
| 3,137,524 A * | 6/1964 | Chancellor, Jr. ............ | 297/284.4 |
| 4,230,366 A * | 10/1980 | Ruda .............................. | 297/487 |
| 5,509,716 A | 4/1996 | Kolena et al. | |
| 6,062,643 A * | 5/2000 | Schroten et al. ......... | 297/216.13 |
| 6,688,686 B1 * | 2/2004 | McEvoy et al. ............ | 297/284.4 |
| 2005/0093352 A1 | 5/2005 | Yasuda et al. | |
| 2006/0076816 A1 | 4/2006 | Fujita et al. | |
| 2009/0001785 A1 | 1/2009 | Swan et al. | |

FOREIGN PATENT DOCUMENTS

| | | |
|---|---|---|
| CN | 1950237 A | 4/2007 |
| DE | 102005055799 A1 | 5/2007 |
| JP | S62-153948 U | 9/1987 |
| JP | 7-136038 A | 5/1995 |
| JP | 7-265169 A | 10/1995 |
| JP | 2002-153351 A | 5/2002 |
| JP | 2004-106656 A | 4/2004 |
| JP | 2004209017 A | 7/2004 |
| JP | 2005126053 A | 5/2005 |
| JP | 2006015964 A | 1/2006 |

* cited by examiner

*Primary Examiner* — Milton Nelson, Jr.
(74) *Attorney, Agent, or Firm* — Gifford, Krass, Sprinkle, Anderson & Citkowski, P.C.

(57) ABSTRACT

A vehicle seat capable, with a simple, lightweight structure, of improving a whiplash moderation effect from a head rest. In the vehicle seat (10), when there is an impact at a rear face of the vehicle, a support frame (50) that is fixed to a reclining rod (46) separately from a seatback frame (32) supports the waist area of a seat occupant from the vehicle rearward side. Thus, a load from the seat occupant that is inputted to the seatback frame (32) is reduced. Therefore, a displacement amount (deformation amount) of the seatback frame (32) to the vehicle rearward side may be suppressed. Thus, a duration until the head area of the seat occupant abuts against a headrest (16) may be shortened. Moreover, the support frame (32) that only supports the waist area of the seat occupant need only be fixed to the reclining rod (46). Therefore, a simple, lightweight structure may be formed.

13 Claims, 14 Drawing Sheets

VEHICLE SEAT

TECHNICAL FIELD

The present invention relates to a vehicle seat.

BACKGROUND ART

Japanese Patent Application Laid-Open (JP-A) No. 2004-106656 illustrates an active headrest structure that moves a headrest to the forward side when the rear side of a vehicle is impacted.

DISCLOSURE OF INVENTION

Subject to be Addressed by the Invention

In an active headrest structure like the above, when there is an impact at the rear side of the vehicle, the head area of a seat occupant may be promptly supported by the headrest, and consequently whiplash of the seat occupant may be moderated.

However, an active headrest has a complicated structure with a large number of components. Consequently, there are problems of increases in manufacturing costs and weight of the vehicle seat.

In consideration of the situation described above, an object of the present invention is to provide a vehicle seat that is capable, with a simple, lightweight structure, of improving a whiplash moderation effect from a headrest.

Means for Addressing the Subject

A vehicle seat relating to a first aspect of the present invention includes: a seatback frame having a top portion to which a headrest is attached; and a support member that is attached at a seat cushion frame side or a vehicle body side separately from the seatback frame, and that supports a waist area of a seat occupant from a vehicle rearward side when there is an impact at a rear face of the vehicle.

Note that the meaning of the term "separately" recited in the first aspect includes meanings in which the support member is attached at the seat cushion frame or at the vehicle body side without the seatback frame being interposed.

In the vehicle seat of the first aspect, when there is an impact at the rear face of the vehicle, the support member that is attached at the seat cushion frame or at the vehicle body separately from the seatback frame supports the waist area of the seat occupant from the vehicle rearward side. Therefore, a load to the vehicle rearward side that is inputted from the seat occupant to the seatback frame is reduced, and therefore a displacement amount (deformation amount) of the seatback frame to the vehicle rearward side may be reduced. Thus, a duration until the head area of the seat occupant abuts (touches) against the headrest (hereinafter referred to as the "contact time") may be shortened, and therefore the whiplash moderation effect from the headrest may be improved. In addition, the support member that only supports the waist area of the seat occupant need only be attached at the seat cushion frame or at the vehicle body. Therefore, a simple, lightweight structure may be formed.

A vehicle seat relating to a second aspect of the present invention is the vehicle seat of the first aspect, in which the support member is specified with a higher stiffness with respect to a load from the vehicle forward side than the seatback frame.

In the vehicle seat of the second aspect, the stiffness of the support member with respect to a load from the vehicle forward side is set higher than the same stiffness of the seatback frame. Therefore, when the vehicle is impacted at the rear face, the waist area of the seat occupant may be firmly supported from the vehicle rearward side by the support member. Thus, a load to the vehicle rearward side that is inputted to the seatback frame from the seat occupant may be excellently reduced.

A vehicle seat relating to a third aspect of the present invention is the vehicle seat of the first aspect or the second aspect, in which the support member includes a rear side abutting portion that abuts against the seatback frame if the seatback frame relatively moves to the vehicle rearward side with respect to the support member.

In the vehicle seat of the third aspect, when the seatback frame relatively moves to the vehicle rearward side with respect to the support member because of a load when the head area of the seat occupant abuts against the headrest, the rear side abutting portion provided at the support member abuts against the seatback frame. Thus, the seatback frame is supported by the rear side abutting portion of the support member, and deformation of the seatback frame is suppressed. Consequently, a speed when the head area of the seat occupant bounces back and moves away from the headrest (hereinafter referred to as the "rebound speed") may be reduced. Thus, the whiplash moderation effect of the headrest may be further improved.

A vehicle seat relating to a fourth aspect of the present invention is the vehicle seat of any one of the first to third aspects, in which the support member includes a front side abutting portion that abuts against the seatback frame if the seatback frame relatively moves to the vehicle forward side with respect to the support member.

In the vehicle seat of the fourth aspect, when, for example, there is an impact at the front face of the vehicle, the seat occupant acts to move by inertia to the vehicle forward side. When the seatback frame relatively moves to the vehicle forward side with respect to the support member because a load from the seat occupant is inputted to the seatback frame via a seatbelt and the like, the seatback frame abuts against the front side abutting portion provided at the support member. Therefore, the seatback frame is supported by the support member, and deformation of the seatback frame is suppressed. Thus, the support member may act as a rigid member when there is a front face impact.

A vehicle seat relating to a fifth aspect of the present invention is the vehicle seat of the first aspect or the second aspect, in which the support member includes a both sides abutting portion that abuts against the seatback frame if the seatback frame relatively moves to the vehicle rearward side with respect to the support member and that abuts against the seatback frame if the seatback frame relatively moves to the vehicle forward side with respect to the support member.

In the vehicle seat of the fifth aspect, if the seatback frame relatively moves to the vehicle rearward side with respect to the support member because of a load when the head area of the seat occupant abuts against the headrest, the seatback frame abuts against the both sides abutting portion provided at the support member. Thus, the both sides abutting portion provides the same function as the rear side abutting portion of the third aspect.

On the other hand, when, for example, the seatback frame relatively moves to the vehicle forward side with respect to the support member because a load from the seat occupant acting to move by inertia to the vehicle forward side when there is an impact at the front face of the vehicle is inputted to the seatback frame via the seatbelt and the like, the seatback frame abuts against the both sides abutting portion provided at the support member. Thus, the both sides abutting portion provides the same function as the front side abutting portion of the fourth aspect.

Thus, in this aspect, the both sides abutting portion of the support member combines the functions of both the rear side abutting portion of the third aspect and the front side abutting portion of the fourth aspect. Therefore, the same operations and effects as with the third aspect and the fourth aspect may be obtained but with the structure being further simplified and reduced in weight.

A vehicle seat relating to a sixth aspect of the present invention is the vehicle seat of the third aspect, in which the rear side abutting portion is disposed to oppose the seatback frame at the rear side of the seatback frame.

In the vehicle seat of the sixth aspect, the rear side abutting portion of the support member opposes the seatback frame from the rear side of the seatback frame. Therefore, when the seatback frame relatively moves to the vehicle rearward side with respect to the support member, the seatback frame may be excellently abutted against the rear side abutting portion.

A vehicle seat relating to a seventh aspect of the present invention is the vehicle seat of the fourth aspect, in which the front side abutting portion is disposed to oppose the seatback frame at the front side of the seatback frame.

In the vehicle seat of the seventh aspect, the front side abutting portion of the support member opposes the seatback frame from the front side of the seatback frame. Therefore, when the seatback frame relatively moves to the vehicle forward side with respect to the support member, the seatback frame may be excellently abutted against the front side abutting portion.

A vehicle seat relating to an eighth aspect of the present invention is the vehicle seat of the fifth aspect, in which the both sides abutting portion is inserted, in a non-contacting state, into a penetrating hole that penetrates through a side portion of the seatback frame in a seat left-right direction.

In the vehicle seat of the eighth aspect, the both sides abutting portion of the support member is inserted in the left-right direction of the seat into the penetrating hole that penetrates through the side portion of the seatback frame, in the non-contacting state. Therefore, when the seatback frame relatively moves to the vehicle rearward side or the vehicle forward side with respect to the support member, the seatback frame may be excellently abutted against the both sides abutting portion.

A vehicle seat relating to a ninth aspect of the present invention is the vehicle seat of any one of the first to eighth aspects, in which the support member is fixed to a reclining rod that is disposed at a rear portion of a seat cushion, two axial direction end portions of the reclining rod being supported at the seat cushion frame.

In the vehicle seat of the ninth aspect, the support member is attached to the seat cushion frame via a reclining rod, which generally has high stiffness. Therefore, a load that is inputted to the support member from the waist area of the seat occupant may be excellently supported at the seat cushion frame.

A vehicle seat relating to a tenth aspect of the present invention is the vehicle seat of the ninth aspect, in which the support member includes: a pair of left and right leg portions that are disposed at left and right side portions of the seatback, lower end portions of the leg portions being fixed to axial direction end sides of the reclining rod; and an occupant support portion that connects between upper end portions of the pair of leg portions in the seat left-right direction at the vehicle rearward side of the waist area of the seat occupant.

In the vehicle seat of the tenth aspect, the occupant support portion of the support member is disposed at the vehicle rearward side of the seat occupant. Therefore, when there is an impact at the rear face of the vehicle, a load to the vehicle rearward side is inputted from the waist area of the seat occupant to the occupant support portion. The load inputted to the occupant support portion is supported at the seat cushion frame via the left and right leg portions of the support member and the reclining rod to which the leg portions are fixed. Here, because the left and right leg portions of the support member are fixed at the axial direction end sides of the reclining rod (that is, the sides that are supported at the seat cushion frame), bending of the reclining rod by the above-mentioned load may be suppressed. Thus, stiffness of support of the seat occupant waist area by the support member may be improved.

A vehicle seat relating to an eleventh aspect of the present invention is the vehicle seat of the tenth aspect, in which the occupant support portion is formed in a plate shape, a plate thickness direction of which is along the front-rear direction of the seatback.

In the vehicle seat of the eleventh aspect, the occupant support portion of the support member is formed in a plate shape. Thus, when there is an impact at the rear face of the vehicle, the waist area of the seat occupant is supported by a plate face of the occupant support portion. Therefore, causing of discomfort to the seat occupant may be suppressed.

A vehicle seat relating to a twelfth aspect of the present invention is the vehicle seat of the eighth aspect, in which the support member includes an occupant support portion that is constituted by a pipe and is disposed at the vehicle rearward side of the waist area of the seat occupant, and an axial direction end portion of the pipe serves as the both sides abutting portion.

In the vehicle seat of the twelfth aspect, the occupant support portion of the support member is disposed at the vehicle rearward side of the seat occupant. Therefore, when there is an impact at the rear face of the vehicle, the waist area of the seat occupant is supported by the occupant support portion. Moreover, the occupant support portion is constituted by the pipe, and the axial direction end portion of the pipe serves as the both sides abutting portion and is inserted into the penetrating hole formed in the side portion of the seatback frame. Thus, the occupant support portion and the both sides abutting portion are constituted by a single pipe. Therefore, a reduction in weight and a reduction in costs of the support member may be promoted.

A vehicle seat relating to a thirteenth aspect of the present invention includes a contact time shortener that, without relatively moving a headrest to a vehicle forward side with respect to a seatback frame, shortens a duration from an impact at a rear face of the vehicle to a head area of a seat occupant abutting against the headrest.

In the vehicle seat of the thirteenth aspect, the duration from an impact at the rear face of the vehicle until the head area of a seat occupant abuts against the headrest (the contact time) is shortened by the contact time shortener. Thus, the whiplash moderation effect from the headrest may be improved. In addition, because it does not relatively move the headrest to the vehicle forward side with respect to the seatback frame as in an active headrest, a simple, lightweight structure may be formed.

A vehicle seat relating to a fourteenth aspect of the present invention is the vehicle seat of the thirteenth aspect, in which the contact time shortener comprises an input load reducer that reduces a load inputted to the seatback frame from the seat occupant when there is an impact at the rear face of the vehicle.

In the vehicle seat of the fourteenth aspect, a load that is inputted to the seatback frame from the seat occupant when there is an impact at the rear face of the vehicle is reduced by the input load reducer. Thus, a displacement amount of the headrest to the vehicle rearward side is reduced, and consequently the contact time may be shortened.

A vehicle seat relating to a fifteenth aspect of the present invention is the vehicle seat of the thirteenth aspect or the fourteenth aspect, in which the contact time shortener comprises a head area turning radius reducer that reduces a turning radius of the head area of the seat occupant when there is an impact at the rear face of the vehicle.

In the vehicle seat of the fifteenth aspect, the turning radius of the head area of a seat occupant when there is an impact at the rear face of the vehicle is shortened by the contact time shortener. Thus, the contact time according to a turning motion of the head area of the seat occupant may be shortened.

Effects of the Invention

As described above, a vehicle seat relating to the first aspect of the present invention may, with a simple, lightweight structure, improve a whiplash moderation effect B by the headrest.

A vehicle seat relating to the second aspect of the present invention may excellently reduce a load to the vehicle rearward side that is inputted to the seatback frame from a seat occupant.

A vehicle seat relating to the third aspect of the present invention may reduce a speed when the head area of a seat occupant bounces back and moves away from the headrest, and therefore further improve the whiplash moderation effect by the headrest.

In a vehicle seat relating to the fourth aspect of the present invention, the support member may act as a stiff member when there is a front face impact.

A vehicle seat relating to the fifth aspect of the present invention may provide the same operations and effects as the third aspect and the fourth aspect, while further simplifying and lightening the structure.

A vehicle seat relating to the sixth aspect of the present invention may cause the seatback frame to excellently abut against the rear side abutting portion.

A vehicle seat relating to the seventh aspect of the present invention may cause the seatback frame to excellently abut against the front side abutting portion.

A vehicle seat relating to the eighth aspect of the present invention may cause the seatback frame to excellently abut against the both sides abutting portion.

A vehicle seat relating to the ninth aspect of the present invention may excellently support a load inputted to the support member from the waist area of a seat occupant at the seatback frame.

A vehicle seat relating to the tenth aspect of the present invention may improve support stiffness by the support member of a seat occupant waist area.

A vehicle seat relating to the eleventh aspect of the present invention may suppress the causing of discomfort to a seat occupant.

A vehicle seat relating to the twelfth aspect of the present invention may promote a reduction in weight and a reduction in costs of the support member.

A vehicle seat relating to the thirteenth aspect of the present invention may, with a simple, lightweight structure, improve a whiplash moderation effect by the headrest.

A vehicle seat relating to the fourteenth aspect of the present invention may shorten the contact time by reducing an amount of displacement of the headrest to the vehicle rearward side when there is an impact at the rear face of the vehicle.

A vehicle seat relating to the fifteenth aspect of the present invention may shorten the contact time according to a turning motion of the head area of a seat occupant.

BEST MODE FOR CARRYING OUT THE INVENTION

<First Exemplary Embodiment>

Herebelow, a vehicle seat 10 relating to a first exemplary embodiment of the present invention is described referring to FIG. 1 to FIG. 8. The vehicle seat 10 relating to this first exemplary embodiment, rather than adding a complicated structure such as an active headrest, moderates whiplash of a seat occupant when there is an impact at a rear face of the vehicle with a minimum of structural alteration and additional framework. Firstly, the concept that the present invention employs is described referring to FIG. 4 to FIG. 8.

—Concept—

Figure 4:
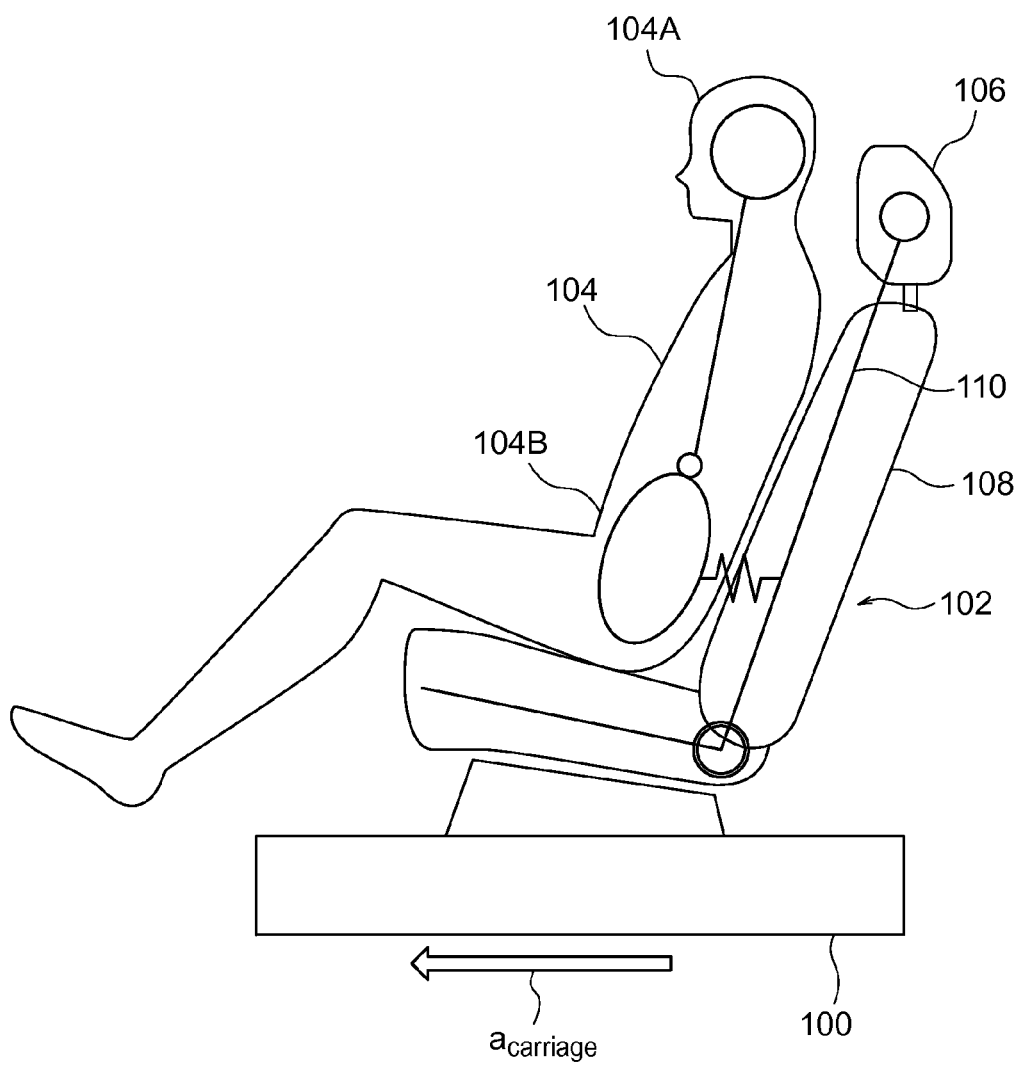
FIG. 4 is a schematic side diagram illustrating testing equipment of a bench test that evaluates performance of a vehicle seat.
Figure 5:
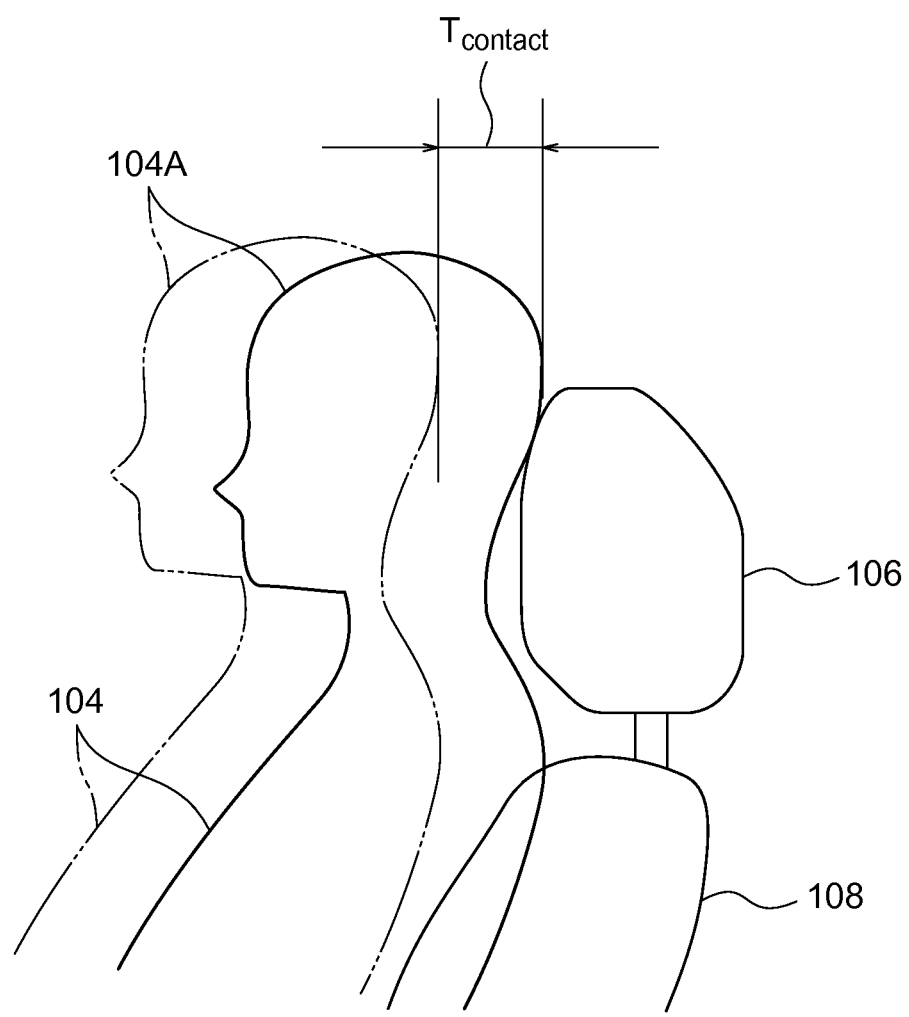
FIG. 5 is a diagram for explaining a duration from an acceleration being applied to an evaluation carriage to a head area of a dummy and a headrest abutting.

In a bench test that evaluates performance of a vehicle seat, as illustrated in FIG. 4, a dummy 104 is seated on a vehicle seat 102 attached to a top portion of an evaluation carriage 100, an acceleration toward a seat forward side (see arrow $a_{carriage}$ in FIG. 4) is applied to the carriage 100, and an evaluation is carried out.

Among the items of evaluation are a duration from the acceleration being applied to the carriage 100 to a head area 104A of the dummy 104 and a headrest 106 abutting (touching) (hereinafter referred to as the "contact time"; see FIG. 5), and a speed when the head area 104A of the dummy 104 bounces back and moves away from the headrest 106 (hereinafter referred to as the "rebound speed"). In order to moderate whiplash of the dummy 104, the shorter the contact time the better and the slower the rebound speed the better.

Figure 6:
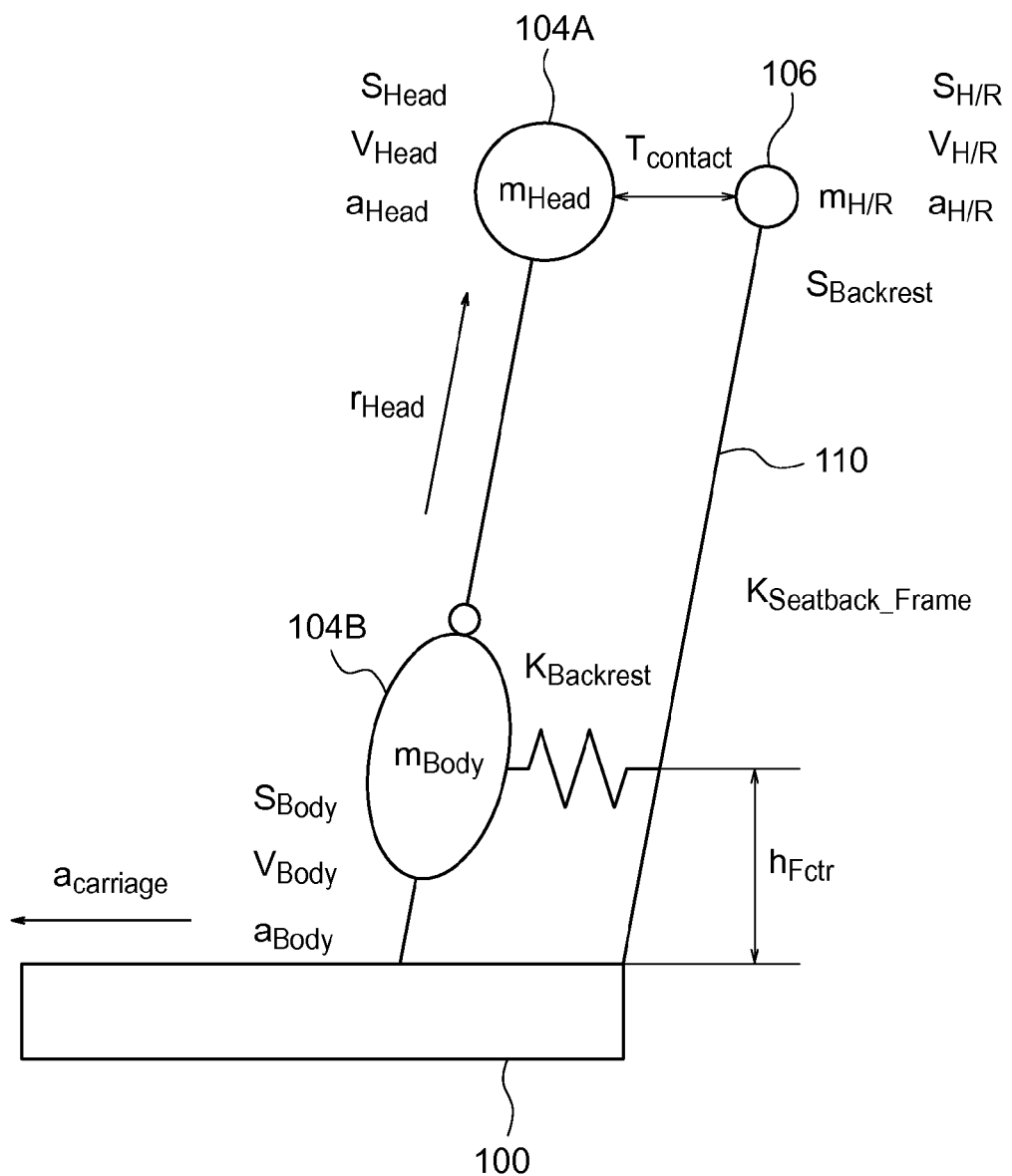
FIG. 6 is a diagram representing a conceptual model of the bench test illustrated in FIG. 4.

If a conceptual model of the bench test described above is to be represented, it may be represented as in FIG. 6. The symbols shown in FIG. 6 represent the following items.

Figure 7A:
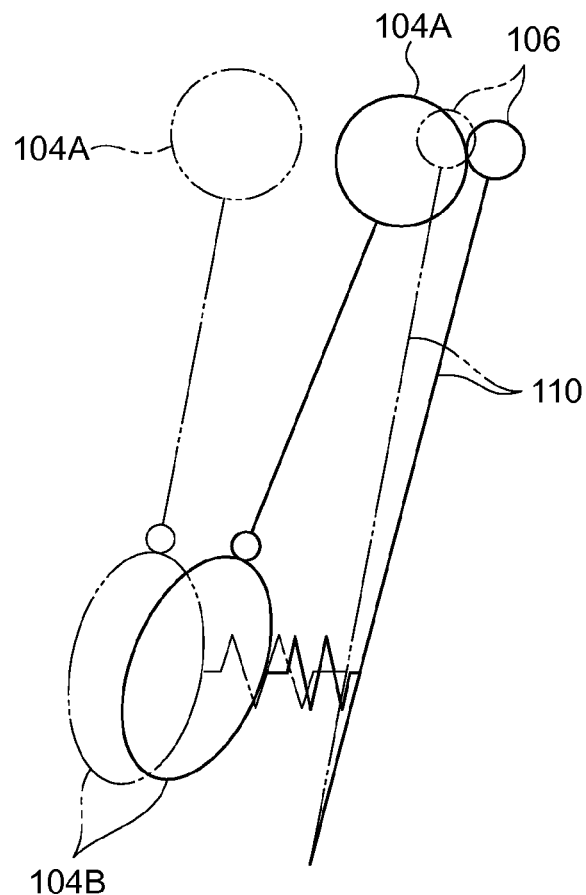
FIG. 7A is a drawing illustrating an action from the acceleration being applied to the evaluation carriage to the head area of the dummy abutting against the head rest.
Figure 7B:
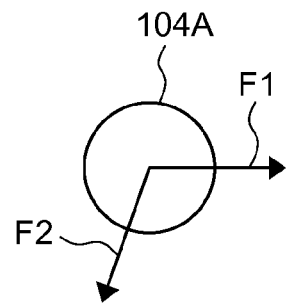
FIG. 7B is a drawing illustrating forces that act on the head area of the dummy.
Figure 7C:
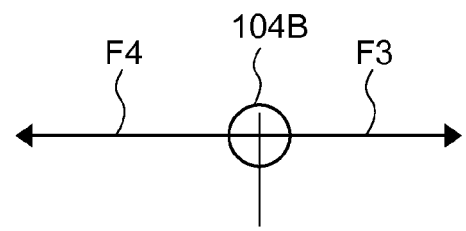
FIG. 7C is a drawing illustrating forces that act on a waist area of the dummy.

$m_{Head}$: mass of head area of dummy
$m_{Body}$: mass of waist area of dummy
$M_{H/R}$: mass of headrest
$K_{Seatback\_Frame}$: stiffness of seatback frame
$K_{Backrest}$: stiffness of pad and springs of seatback
$h_{Back}$: height of head area of dummy
$h_{Fctr}$: height of center of load applied to waist area of dummy from a carriage upper surface
$r_{Head}$: turning radius of head area of dummy
$F_{ctr}$: centripetal force of head area of dummy
$a_{carriage}$: acceleration inputted to carriage
S: displacement
V: speed
a: acceleration An action from the acceleration being applied to the carriage 100 to the head area 104A of the dummy 104 abutting against the headrest 106 is represented as in FIG. 7A to FIG. 7C. In FIG. 7B, arrow F1 represents an inertial force acting on the head area 104A of the dummy 104, and arrow F2 represents a centripetal force acting on the head area 104A. In FIG. 7C, Arrow F3 represents an inertial force acting on a waist area 104B of the dummy 104, and arrow F4 represents a reaction force that the waist area 104B receives from a seatback 108.

In the action illustrated in FIG. 7A to FIG. 7C, possible methods of shortening the contact time ($T_{contact}$) may be:
(1) Reducing weight of the headrest ($m_{H/R}$ is to be smaller);
(2) Raising stiffness of the seatback frame ($K_{Seatback\_Frame}$ is to be larger);
(3) Lowering stiffness of the pad and springs of the seatback ($K_{Backrest}$ is to be smaller);
(4) Lowering the position of a center of input to the pad and springs of the seatback ($h_{Fetr}$ is to be lower);
(5) Reducing a turning radius of the head area of the dummy ($r_{Head}$ is to be smaller); and
(6) Reducing a load that is inputted to the seatback frame.

Figure 8A:
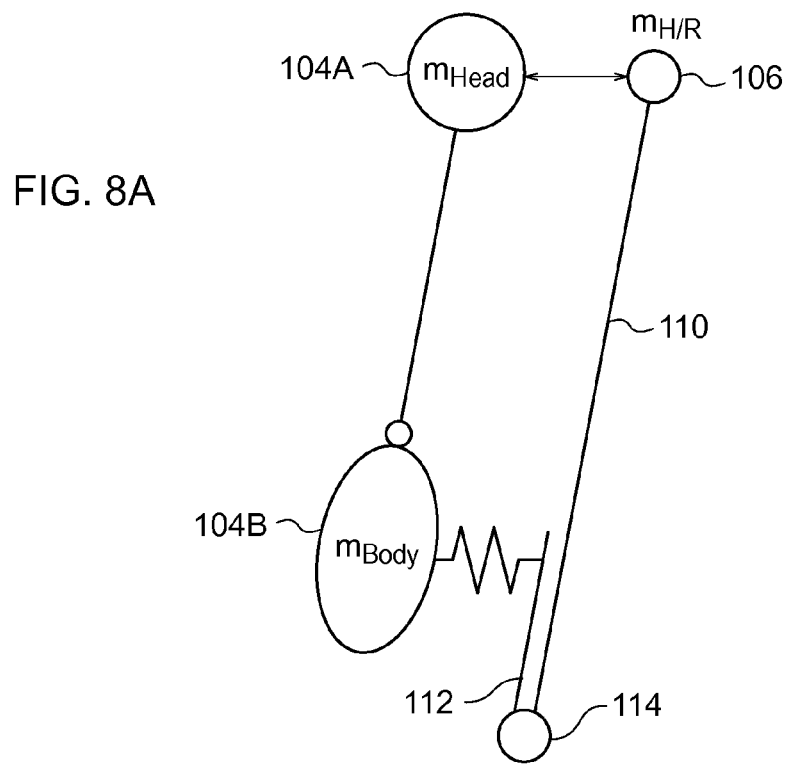
FIG. 8A is a diagram illustrating a conceptual model of the present first exemplary embodiment.

From the above concepts, for example, the structure illustrated in FIG. 8A may be considered as a countermeasure configuration. The structure illustrated in FIG. 8A employs the concept of the above (6). In this structure, a support frame 112 that is a separate body from a seatback frame 110 is fixed at a seat cushion frame (here, a reclining rod 114) separately from the seatback frame 110. This support frame 112 constitutes an input load reducer, and is formed with a higher stiffness than the seatback frame 110.

In the above-mentioned structure, a load from the waist area 104B of the dummy 104 is inputted to the support frame 112 before the seatback frame 110 is applied the load. Thus, a load to the carriage rearward side that is inputted to the seatback frame 110 from the dummy 104 is reduced. Therefore, a displacement amount (deformation amount) of the seatback frame 110 to the rearward side with respect to the carriage is reduced. Thus, because the contact time is shortened, a whiplash moderation effect from the headrest 106 is improved. A ratio of the load that is inputted from the dummy 104 to the support frame 112 to the load that is inputted from the dummy 104 to the seatback frame 110 is around, for example, 7:3 or 6:4.

After the support frame 112 and the seatback frame 110 have been deformed by the load from the dummy 104, the seatback frame 110 abuts against the support frame 112, and the support frame 112 and the seatback frame 110 integrally support the dummy 104. Thus, because deformation of the seatback frame 110 is suppressed, the aforementioned rebound speed is reduced. Therefore, the whiplash moderation effect from the headrest 106 is further improved.

Figure 8B:
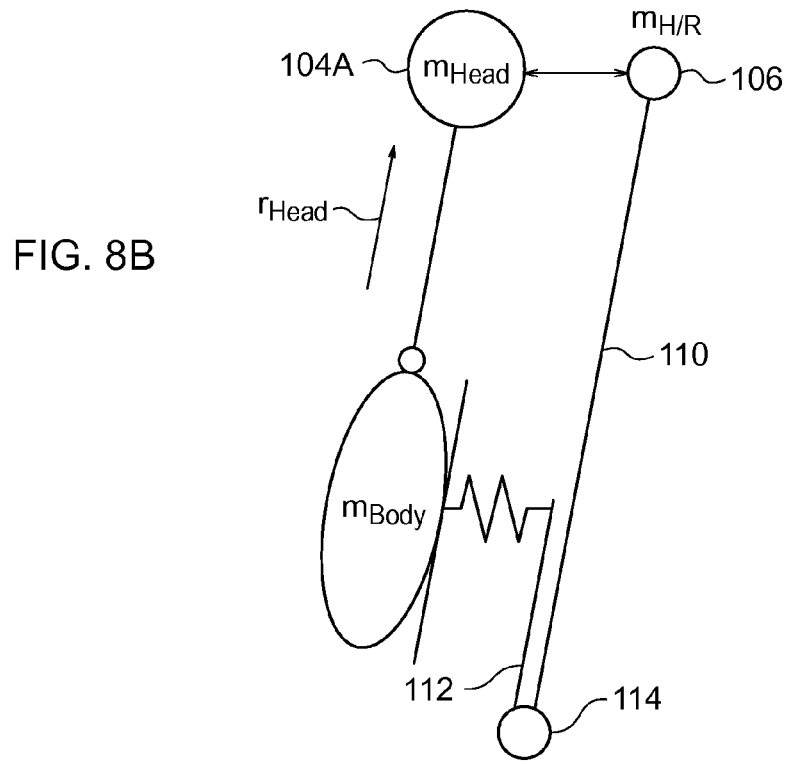
FIG. 8B is a diagram illustrating an example in which, in FIG. 8A, an additional measure is applied.

As an additional measure, as illustrated in FIG. 8B, the support frame 112 is extended upward and supports an upper part of the waist area of the dummy 104, and the turning radius of the head area 104A of the dummy 104 is reduced. Therefore, the contact time according to the turning motion of the head area 104A of the dummy 104 is shortened. In other words, with this additional measure, the support frame 112 functions to shorten a head area turning radius.

There is no need to raise the stiffness of the seatback frame 110 except for when there is an impact at the rear face of the vehicle. In the configuration described above, a resonance frequency of the seatback may be lowered. As a result, seat vibrations, of which seat vibrations when a four-cylinder engine is idling are representative (hereinafter referred to as "idling vibrations"), may be suppressed. The vehicle seat 10 relating to this first exemplary embodiment is a case which is practiced by the configuration described above.

—Structure of the Vehicle Seat 10 Relating to the Present First Exemplary Embodiment—

Figure 1:
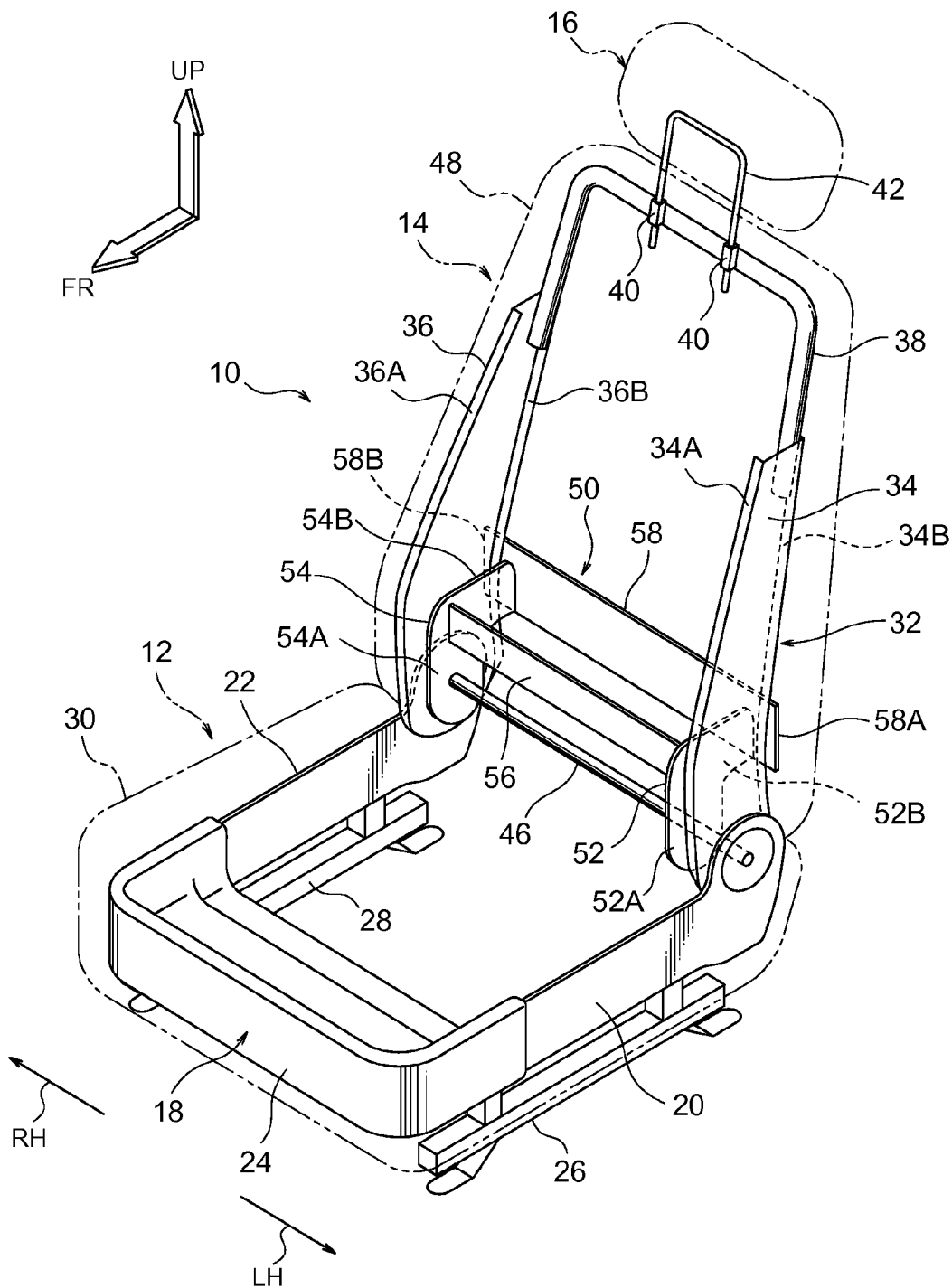
FIG. 1 is a perspective diagram illustrating structure of a frame of a vehicle seat relating to a first exemplary embodiment.
Figure 2:
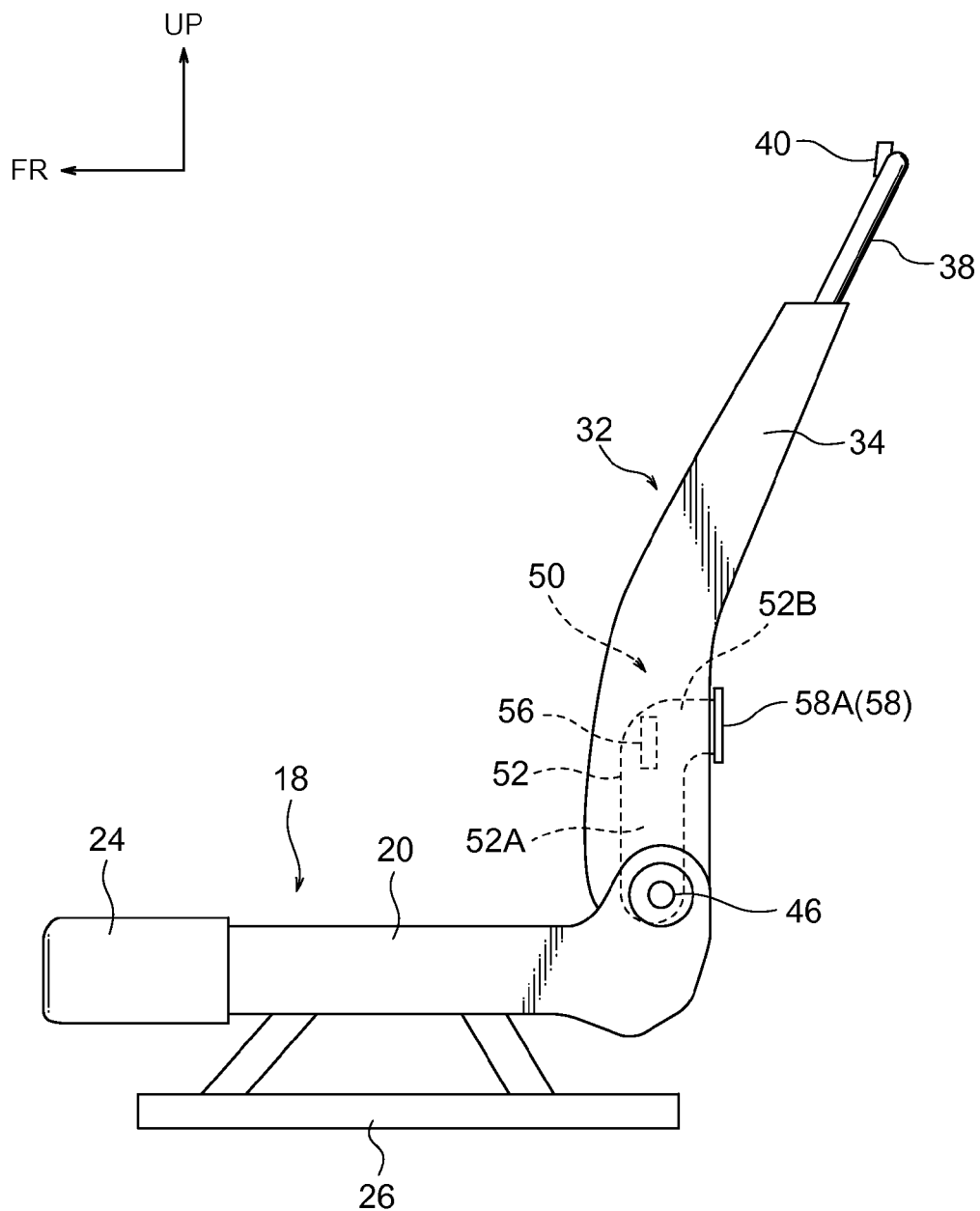
FIG. 2 is a side diagram illustrating structure of the frame illustrated in FIG. 1.
Figure 3:
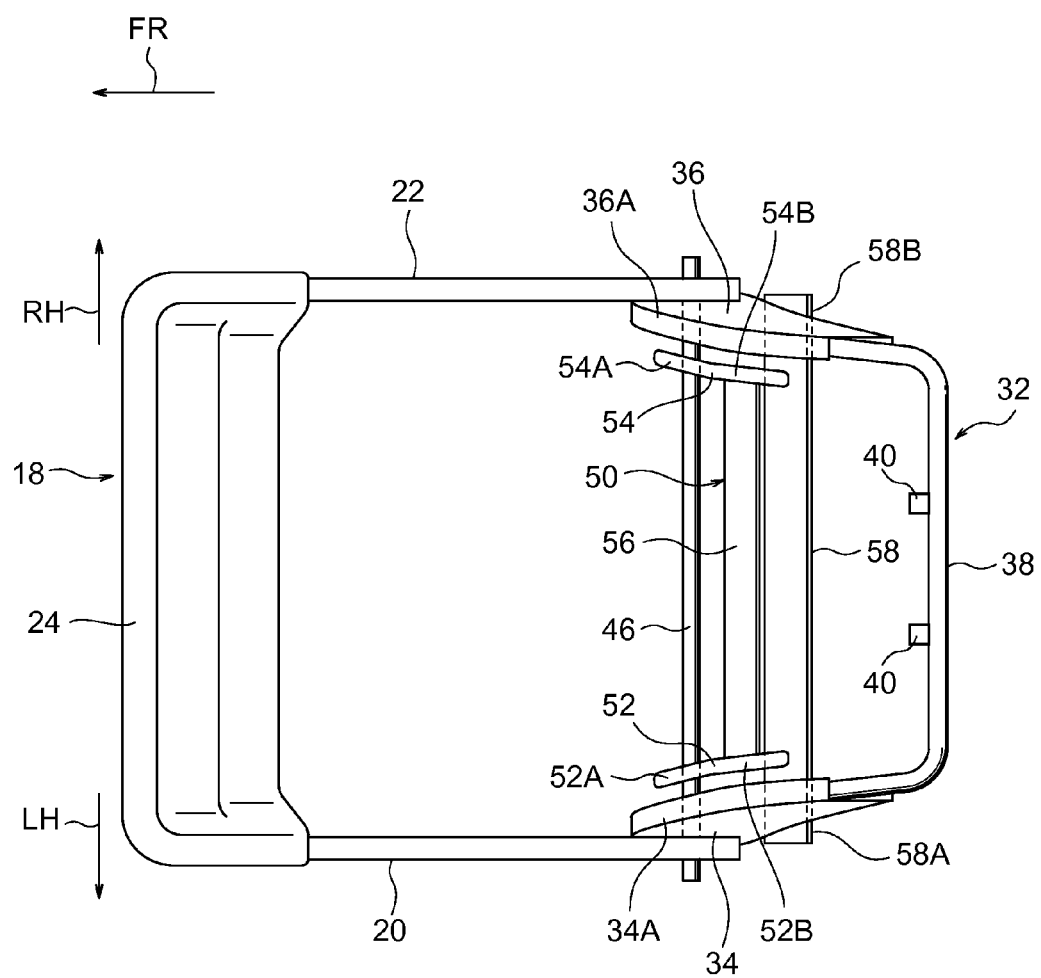
FIG. 3 is a plan diagram illustrating structure of the frame illustrated in FIG. 1.

Herebelow, structure of the vehicle seat 10 relating to the first exemplary embodiment of the present invention is described referring to FIG. 1 to FIG. 3. Herein, the arrow FR in the drawings indicates a vehicle forward side, the arrow UP indicates the vehicle upward side, the arrow LH indicates the vehicle leftward side, and the arrow RH indicates the vehicle rightward side. In the present exemplary embodiment, the front, rear, left, right, up and down directions of the vehicle substantially correspond with the front, rear, left, right, up and down directions of the vehicle seat 10.

As illustrated in FIG. 1, the vehicle seat 10 is provided with a seat cushion 12 for an occupant to sit on, a seatback 14 that is reclinably linked to a rear end portion of the seat cushion 12 and is used as a back rest of the seat occupant, and a headrest 16 that is attached to a top portion of the seatback 14.

The seat cushion 12 includes a seat cushion frame 18, which is a skeleton member. The seat cushion frame 18 is formed in a frame shape as viewed in the up-down direction, and is structured to include a pair of left and right side frame portions 20 and 22, a front frame portion 24 and a reclining rod 46. The side frame portions 20 and 22 are disposed at left and right side portions of the seat cushion 12 and extend in the front-rear direction of the seat cushion 12. The front frame portion 24 connects between front end portions of the pair of left and right side frame portions 20 and 22 in the left-right direction of the seat cushion 12. The reclining rod 46 connects between rear end portions of the pair of left and right side frame portions 20 and 22 in the left-right direction of the seat cushion 12. The side frame portions 20 and 22 and the front frame portion 24 are formed by a metal plate material being press-formed, and the reclining rod 46 is formed by a pipe element.

The side frame portions 20 and 22 are disposed to be opposing in the seat left-right direction in a state in which the plate thickness directions thereof are along the seat left-right direction. Leg portions 26 and 28 are respectively attached to lower sides of the side frame portions 20 and 22, and these leg portions 26 and 28 are joined to a floor portion of the vehicle body (not illustrated).

Unillustrated seat cushion springs and a seat cushion pad are attached to the seat cushion frame 18 with the structure described above. A surface of the seat cushion pad is covered by a seat cushion skin 30.

Meanwhile, the seatback 14 includes a seatback frame 32, which is a skeleton member. Viewed in the front-rear direction, the seatback frame 32 is formed substantially in an inverted "U" shape whose seat downward side is opened, and is structured to include a pair of left and right side frame portions 34 and 36 and an upper frame 38. The side frame portions 34 and 36 are disposed at left and right side portions of the seatback 14 and extend in the up-down direction of the seatback 14. The upper frame 38 connects between upper end portions of the pair of left and right side frame portions 34 and 36 in the left-right direction of the seatback 14. The upper frame 38 is formed by bending of a pipe and the side frame portions 34 and 36 are formed by press-forming of a metal plate material.

A pair of left and right headrest support portions 40 are provided at a top portion of the upper frame 38. Leg portions of a headrest frame 42 that constitutes a framework of the headrest 16 are connected to these headrest support portions 40.

The side frame portions 34 and 36 are disposed to be opposing in the seat left-right direction in a state in which the plate thickness directions thereof are along the seat left-right direction. Front walls 34A and 36A and rear walls 34B and 36B are provided protruding inward in the seat left-right direction (the seat width direction) at front edge portions and rear edge portions of the side frame portions 34 and 36.

The side frame portion 34 at the left side of the seat is disposed at the inner side with respect to a rear end portion of the side frame portion 20 of the seat cushion frame 18, and is superposed with the side frame portion 20 in the plate thickness direction. The side frame portion 36 at the right side of the seat is disposed at the inner side with respect to a rear end portion of the side frame portion 22 of the seat cushion frame 18, and is superposed with the side frame portion 22 in the plate thickness direction. The reclining rod 46 penetrates through the respective superposed portions. Thus, the lower end portions of the side frame portions 34 and 36 and the rear end portions of the side frame portions 20 and 22 are rotatably linked by the reclining rod 46.

The reclining rod 46 mentioned above constitutes an unillustrated reclining mechanism that is provided at a rear portion of the seat cushion 12. The reclining rod 46 is disposed in a state in which the axial direction thereof is along the seat left-right direction. One axial direction end portion of the reclining rod 46 is supported by the side frame portion 20 of the seat cushion frame 18, and the other axial direction end portion is supported by the side frame portion 22.

Unillustrated seatback springs and a seatback pad are attached to the seatback 14 with the structure described above, and a surface of the seatback pad is covered with a seatback skin 48.

A support frame 50 that serves as a support member is also provided at the vehicle seat 10, inside the seatback 14. The support frame 50 is disposed between the side frame portions 34 and 36 of the seatback frame 32, and is constituted by a pair of left and right leg portions 52 and 54, an occupant support portion 56 that connects between upper end portions of the leg portions 52 and 54 in the seat left-right direction, and a frame support portion 58 that is disposed at the rearward side of the occupant support portion 56 and connects between the upper end portions of the leg portions 52 and 54 in the seat left-right direction.

The pair of left and right leg portions 52 and 54 are formed substantially in inverted "L" shapes of a metal plate material, and are disposed to be opposing in the seat left-right direction in a state in which the plate thickness directions thereof are along the seat left-right direction. The leg portions 52 and 54 are provided with main body portions 52A and 54A that extend in the up-down direction and rearward extension portions 52B and 54B that are extended to the seat rearward side from upper portions of the main body portions 52A and 54A. A width dimension of the main body portions 52A and 54A along the seat front-rear direction is set to be smaller than a width dimension of the side frame portions 34 and 36 along the seat front-rear direction (around a half thereof in the present exemplary embodiment), and the main body portions 52A and 54A are disposed to oppose the side frame portions 34 and 36 at a seat front-rear direction middle portion thereof. A height dimension of the leg portions 52 and 54 is set to about one third of a height dimension of the side frame portions 34 and 36 in the present exemplary embodiment.

The seat left side leg portion 52 is disposed close to the side frame portion 34, and is fixed by welding to the one axial direction end portion of the reclining rod 46 penetrating through the lower end side of the main body portion 52A. The seat right side leg portion 54 is disposed close to the side frame portion 36, and is fixed by welding to the other axial direction end portion of the reclining rod 46 penetrating through the lower end portion of the main body portion 54A. Thus, the support frame 50 is fixed to the reclining rod 46 of the seat cushion frame 18 separately from the seatback frame 32 (without the seatback frame 32 being interposed). In this exemplary embodiment, the support frame 50 is fixed to the reclining rod 46 in a state of non-contact with the seatback frame 32, but the above term "separately" includes cases in which the support frame 50 and the seatback frame 32 are touching. That is, even if the two are touching, it is acceptable if there is a state of contact to an extent such that a load inputted to the support frame 50 from the seat forward side is not inputted to the seatback frame 32 or, even if the load is inputted, the seatback frame 32 hardly at all displaces to the vehicle rearward side.

Herein, a method of fixing of the leg portions 52 and 54 to the reclining rod 46 is not limited to welding, and other fixing methods may be employed. For example, a configuration is possible in which respective collar-form flange portions are formed at both axial direction end portions of the reclining rod 46 and the leg portions 52 and 54 are fastened to these flange portions by bolts and nuts.

The occupant support portion 56 is formed in a long, narrow plate shape of a metal plate material, and disposed in a state in which the length direction thereof is along the left-right direction of the seatback 14 and the plate thickness direction is along the front-rear direction of the seatback 14. One length direction end portion of the occupant support portion 56 is welded to an upper portion of the main body portion 52A of the leg portion 52, and the other length direction end portion of the occupant support portion 56 is welded to an upper portion of the main body portion 54A of the leg portion 54.

The occupant support portion 56 described above is disposed between a lower portion of the side frame portion 34 and a lower portion of the side frame portion 36 and, in a state in which an occupant is sitting on the seat cushion 12, is disposed at the seat rearward side of the waist area of the seat occupant at a height that is the same height as the waist area. In the present exemplary embodiment, the occupant support portion 56 is disposed at a height around one third from the bottom relative to the height of the side frame portions 34 and 36 (a height around one quarter from the bottom relative to the height of the seatback frame 32). A configuration is formed in which a predetermined gap is maintained between the occupant support portion 56 and the waist area of the seat occupant, and the unillustrated seatback pad and the seatback skin 48 are interposed in this gap. Thus, discomfort is not caused to the seat occupant. It is preferable if the occupant support portion 56 is disposed at the forward side of the seatback 14 relative to the front-rear direction middle of the side frame portions 34 and 36 in the side view illustrated in FIG. 2.

Meanwhile, the frame support portion 58 is formed in a long, narrow plate shape of a metal plate material, and disposed in a state in which the length direction thereof is along the left-right direction of the seatback 14 and the plate thickness direction is along the front-rear direction of the seatback 14. One length direction end portion of the frame support portion 58 is welded to the rear end of the rearward extension portion 52B of the leg portion 52, and the other length direction end portion of the occupant support portion 56 is welded to the rear end of the rearward extension portion 54B of the leg portion 54.

One length direction end portion of the frame support portion 58, which protrudes to the seat left side relative to the rearward extension portion 52B, serves as a rear side abutting portion 58A. This rear side abutting portion 58A is disposed at the rear side of the side frame portion 34, and opposes the rear wall 34B of the side frame portion 34 with a predetermined gap opened therebetween. Another length direction end portion of the frame support portion 58, which protrudes to the seat right side relative to the rearward extension portion 54B, serves as a rear side abutting portion 58B. This rear side abutting portion 58B is disposed at the rear side of the side frame portion 36, and opposes the rear wall 36B of the side frame portion 36 with a predetermined gap opened therebetween.

The support frame 50 with the structure described above is specified to have a higher stiffness than the seatback frame 32.

—Operations and Effects of the First Exemplary Embodiment—

Next, operations and effects of this first exemplary embodiment are described.

In the vehicle seat 10 with the structure described above, when there is an impact at the rear face of the vehicle, the occupant support portion 56 of the support frame 50 that is attached to the reclining rod 46 separately from the seatback frame 32 supports the waist area of a seat occupant, which is acting to move by inertia to the vehicle rearward side, from the vehicle rearward side thereof. Thus, a load to the vehicle rearward side that is inputted to the seatback frame 32 from the seat occupant is reduced, and therefore a displacement amount (deformation amount) of the seatback frame 32 to the vehicle rearward side is reduced. Thus, the duration until the head area of the seat occupant abuts against the headrest 16 (the contact time) may be shortened, and therefore a whiplash moderation effect of the headrest 16 may be improved.

Furthermore, in the vehicle seat 10, when the seatback frame 32 relatively moves to the vehicle rearward side with respect to the support frame 50 because of a load when the head area of the seat occupant abuts against the headrest 16, the rear walls 34B and 36B of the side frame portions 34 and 36 abut against the rear side abutting portions 58A and 58B of the support frame 50. Thus, the seatback frame 32 is supported by the support frame 50, and deformation of the seatback frame 32 is suppressed. Therefore, a speed when the head area of the seat occupant bounces back and moves away from the headrest 16 (the rebound speed) may be reduced. Thus, the whiplash moderation effect from the headrest 16 may be further improved.

Furthermore, when there is an impact at the rear face of the vehicle as described above, because the seatback frame 32 is supported (reinforced) by the support frame 50, there is no need to improve stiffness of the seatback frame 32 for times of usual use. Therefore, a resonance frequency of the seatback 14 may be lowered. As a result, seat vibrations such as idling vibrations and the like may be reduced. Thus, in this vehicle seat 10, noise and vibration performance (vibrations and vibration noise suppression performance, known as NV characteristics) may be improved at low cost.

Further, in the vehicle seat 10, it is sufficient just to attach the support frame 50 that is simply constituted by a metal plate material to the reclining rod 46. Therefore, a simple, lightweight structure may be formed. Hence, because the weight of the vehicle seat is not greatly increased as with an active headrest, a lowering of the resonance frequency of the vehicle seat may be avoided. Therefore, vibration problems that would be caused by a lowering in resonance frequency may be prevented from occurring. Moreover, because the structure is not complex as with an active headrest, unusual noises due to interference between structural components may be prevented from occurring.

In this vehicle seat 10, because the support frame 50 is attached to the reclining rod 46 with high stiffness, a load that is inputted to the support frame 50 from the waist area of the seat occupant may be excellently supported at the seat cushion frame 18 side.

In this vehicle seat 10, because the left and right leg portions 52 and 54 of the support frame 50 are fixed to the axial direction end sides of the reclining rod 46 (that is, the sides that are supported by the side frame portions 20 and 22), bending of the reclining rod 46 by a load from the seat occupant may be suppressed. Thus, a support stiffness for the seat occupant waist area by the support frame 50 may be improved.

In this vehicle seat 10, the occupant support portion 56 of the support frame 50 is formed in a plate shape. Thus, when there is an impact at the rear face of the vehicle, the waist area of the seat occupant is supported by a plate face of the occupant support portion 56. Therefore, the causing of discomfort to the seat occupant may be suppressed.

In this vehicle seat 10, the rear side abutting portions 58A and 58B of the support frame 50 are disposed to oppose the seatback frame 32 at the rear side of the seatback frame 32. Therefore, when the seatback frame 32 relatively moves to the vehicle rearward side with respect to the support frame 50, the seatback frame 32 may be excellently abutted against the rear side abutting portions 58A and 58B.

In the first exemplary embodiment described above, the rear side abutting portions 58A and 58B of the support frame 50 (the support member) are disposed to oppose the seatback frame 32 at the rear side of the seatback frame 32, but the present invention is not to be limited thus. It is sufficient if a rear side abutting portion abuts against a seatback frame when the seatback frame relatively moves to the vehicle rearward side with respect to a support member. The same point applies in a third exemplary embodiment of the present invention which is described below.

<Second Exemplary Embodiment>

Figure 9:
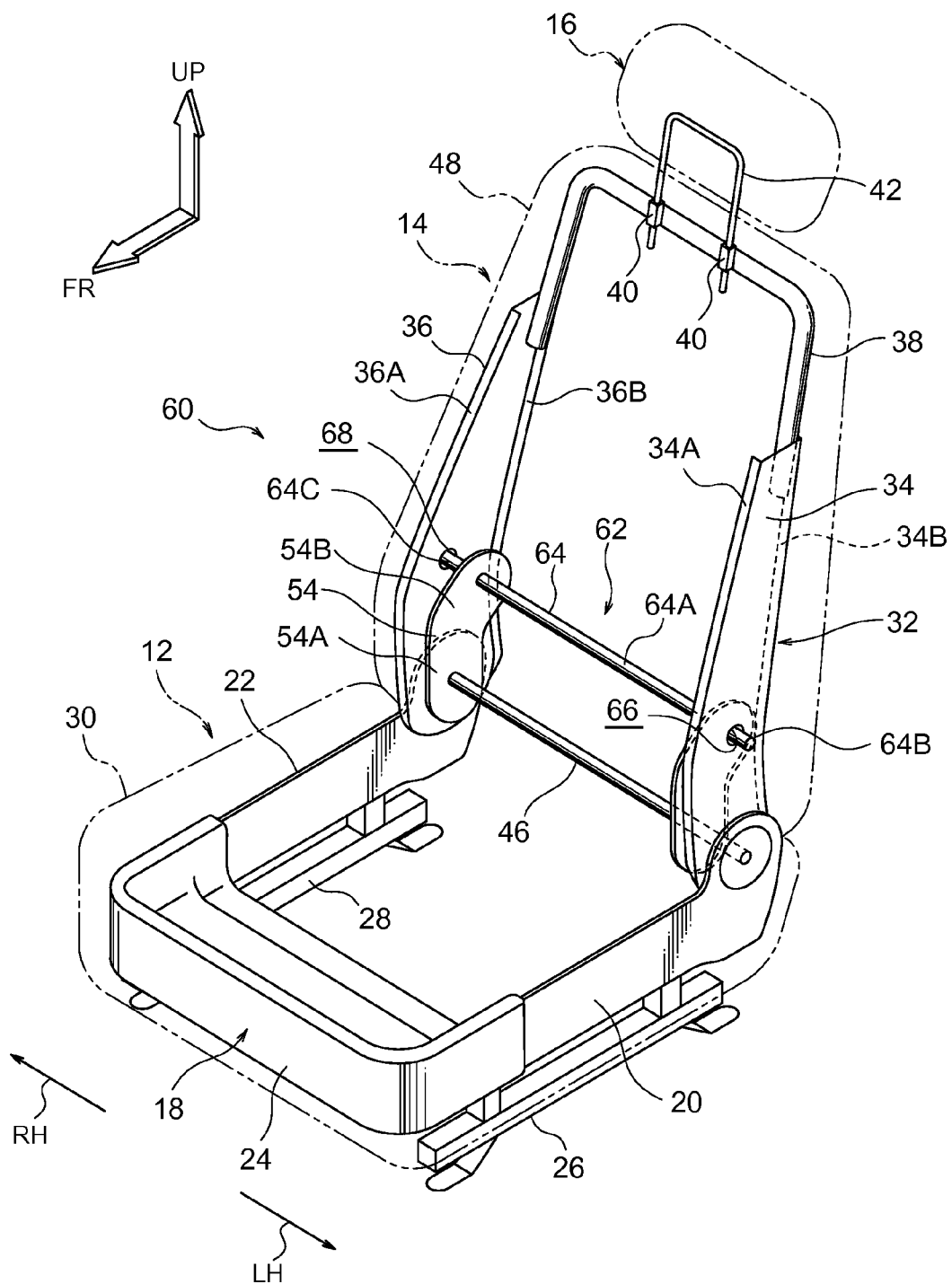
FIG. 9 is a perspective diagram illustrating structure of a frame of a vehicle seat relating to a second exemplary embodiment.
Figure 10:
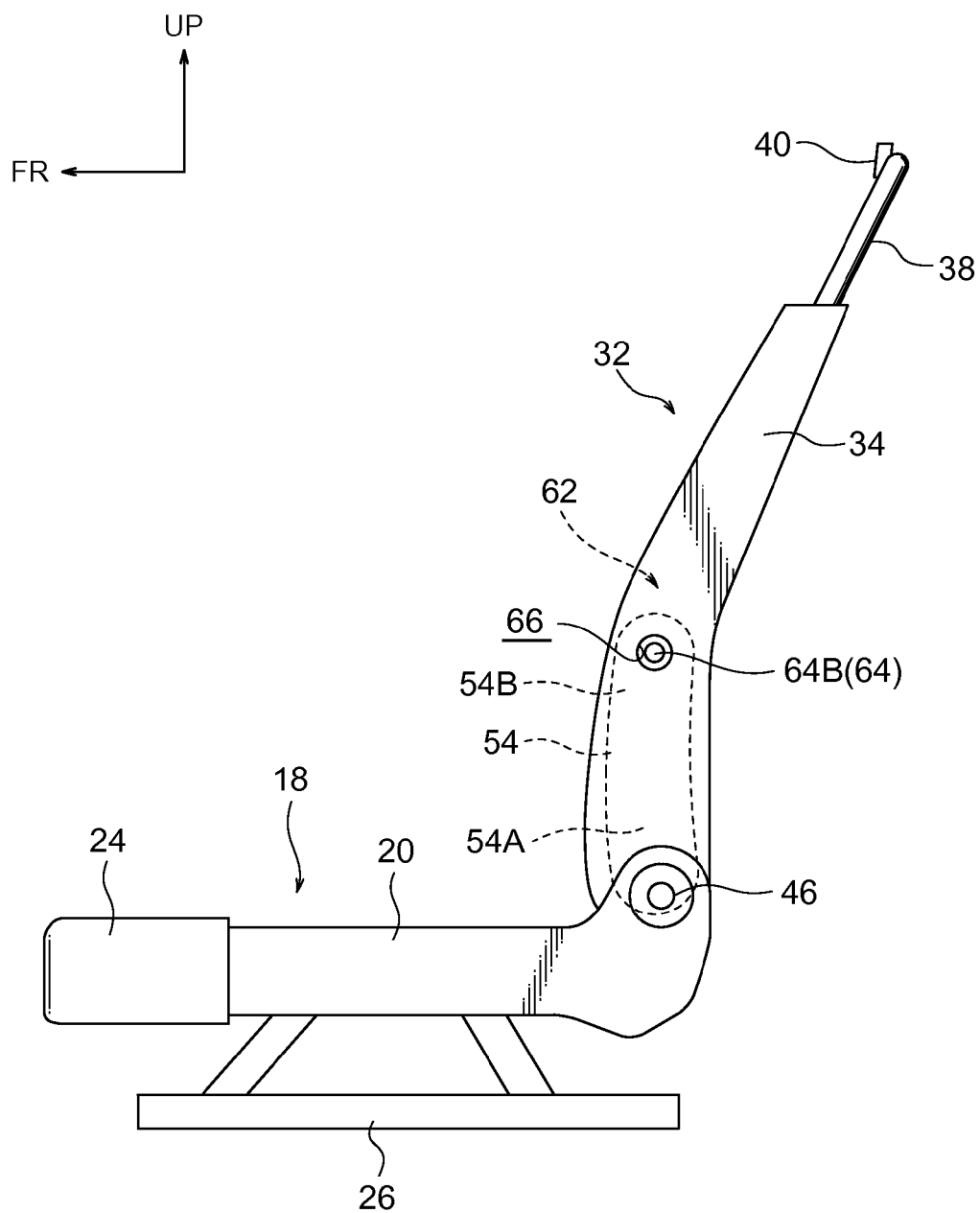
FIG. 10 is a side diagram illustrating structure of the frame illustrated in FIG. 9.
Figure 11:
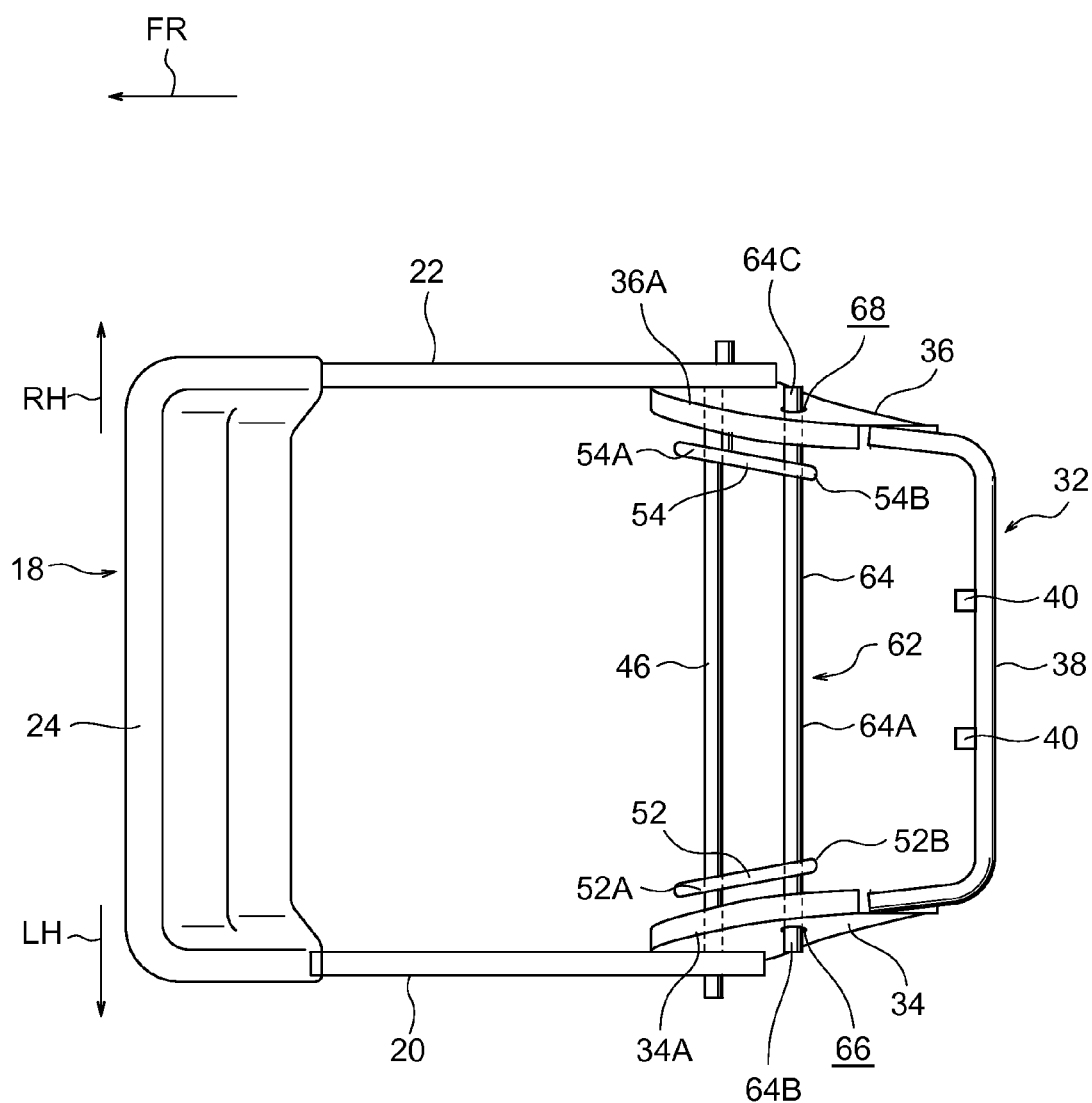
FIG. 11 is a plan diagram illustrating structure of the frame illustrated in FIG. 9.

Next, a vehicle seat 60 relating to a second exemplary embodiment of the present invention is described referring to FIG. 9 to FIG. 11. Structures and operations that are basically the same as in the first exemplary embodiment are assigned the same reference numerals as in the first exemplary embodiment, and descriptions thereof are not given.

The vehicle seat 60 relating to this exemplary embodiment has basically the same structure as the vehicle seat 10 relating to the first exemplary embodiment, but structure of a support frame 62 (the support member) differs from the support frame 50 relating to the first exemplary embodiment. This support frame 62 is provided with a pair of left and right leg portions 52 and 54 that are basically the same as the leg portions 52 and 54 relating to the first exemplary embodiment. However, in this exemplary embodiment, the rearward extension portions 52B and 54B of the leg portions 52 and 54 extend rearward and diagonally upward in the vehicle from the upper portions of the main body portions 52A and 54A.

Upper end portions of the rearward extension portions 52B and 54B are connected in the seat left-right direction by a pipe 64 that is disposed with the axial direction thereof along the seat left-right direction. One axial direction end side of this pipe 64 is welded to the rearward extension portion 52B in a state of penetrating through the rearward extension portion 52B, and the other axial direction end side is welded to the rearward extension portion 54B in a state of penetrating through the rearward extension portion 54B. A portion of this pipe 64 that is disposed between the rearward extension portions 52B and 54B serves as an occupant support portion 64A.

One axial direction end portion of the pipe 64, which protrudes to the left side of the rearward extension portion 52B, serves as a both sides abutting portion 64B. This both sides abutting portion 64B is inserted into a circular penetrating hole 66 formed in the side frame portion 34 at the left side, in a non-contacting state. The other axial direction end portion of the pipe 64, which protrudes to the right side of the rearward extension portion 54B, serves as a both sides abutting portion 64C. This both sides abutting portion 64C is inserted into a circular penetrating hole 68 formed in the side frame portion 36 at the right side, in a non-contacting state. These penetrating holes 66 and 68 penetrate through the side frame portions 34 and 36 in the seat left-right direction.

—Operations and Effects of the Present Second Exemplary Embodiment—

In the vehicle seat 60 with the structure described above, when there is an impact at the rear face of the vehicle, the occupant support portion 64A of the support frame 62 that is attached to the reclining rod 46 separately from the seatback frame 32 supports the waist area of the seat occupant, which is acting to move by inertia to the vehicle rearward side, from the rearward side thereof. Thus, the contact time is shortened similarly to the first exemplary embodiment. Then, when the seatback frame 32 relatively moves to the vehicle rearward side with respect to the support frame 62 because of a load when the head area of the seat occupant abuts against the headrest 16, inner periphery portions of the penetrating holes 66 and 68 abut against the both sides abutting portions 64B and 64C of the pipe 64. Thus, the seatback frame 32 is supported by the support frame 62 and deformation of the seatback frame 32 is suppressed. Therefore, similarly to the first exemplary embodiment, the rebound speed may be reduced.

Thus, in this exemplary embodiment too, basically the same operational effects as in the first exemplary embodiment are realized.

Furthermore, in this vehicle seat 60, because the occupant support portion 64A and the both sides abutting portions 64B and 64C are constituted by the single pipe 64, a reduction in weight and a reduction in costs of the support frame 62 may be promoted. Hence, a reduction in weight and a reduction in costs of the vehicle seat 60 may be promoted.

In this vehicle seat 60, when, for example, there is an impact at the front face of the vehicle, the seat occupant acts to move by inertia to the vehicle forward side. When the seatback frame 32 relatively moves to the vehicle forward side with respect to the support frame 62 because a load from the seat occupant is inputted to the seatback frame 32 via a seatbelt and the like, the inner periphery portions of the penetrating holes 66 and 68 abut against the rear side abutting portions 58A and 58B of the pipe 64. Thus, the seatback frame 32 is supported by the support frame 50, and deformation of the seatback frame 32 is suppressed. Therefore, the support frame 62 may act as a rigid member when there is a front face impact.

In this vehicle seat 60, because the both sides abutting portions 64B and 64C of the support frame 62 are inserted into the penetrating holes 66 and 68 formed in the side frame portions 34 and 36 of the seatback frame 32 in non-contacting states, the seatback frame 32 may be excellently abutted against the both sides abutting portions 64B and 64C when the seatback frame 32 relatively moves to the vehicle rearward side and to the forward side with respect to the support frame 62.

The second exemplary embodiment described above has a configuration in which the both sides abutting portions 64B and 64C of the support frame 62 (the support member) are inserted into the penetrating holes 66 and 68 formed in the side frame portions 34 and 36, but the present invention is not to be limited thus. It is sufficient if a both sides abutting portion abuts against the seatback frame when the seatback frame 32 relatively moves to the vehicle forward side and to the rearward side with respect to the support member.

<Third Exemplary Embodiment>

Figure 12:
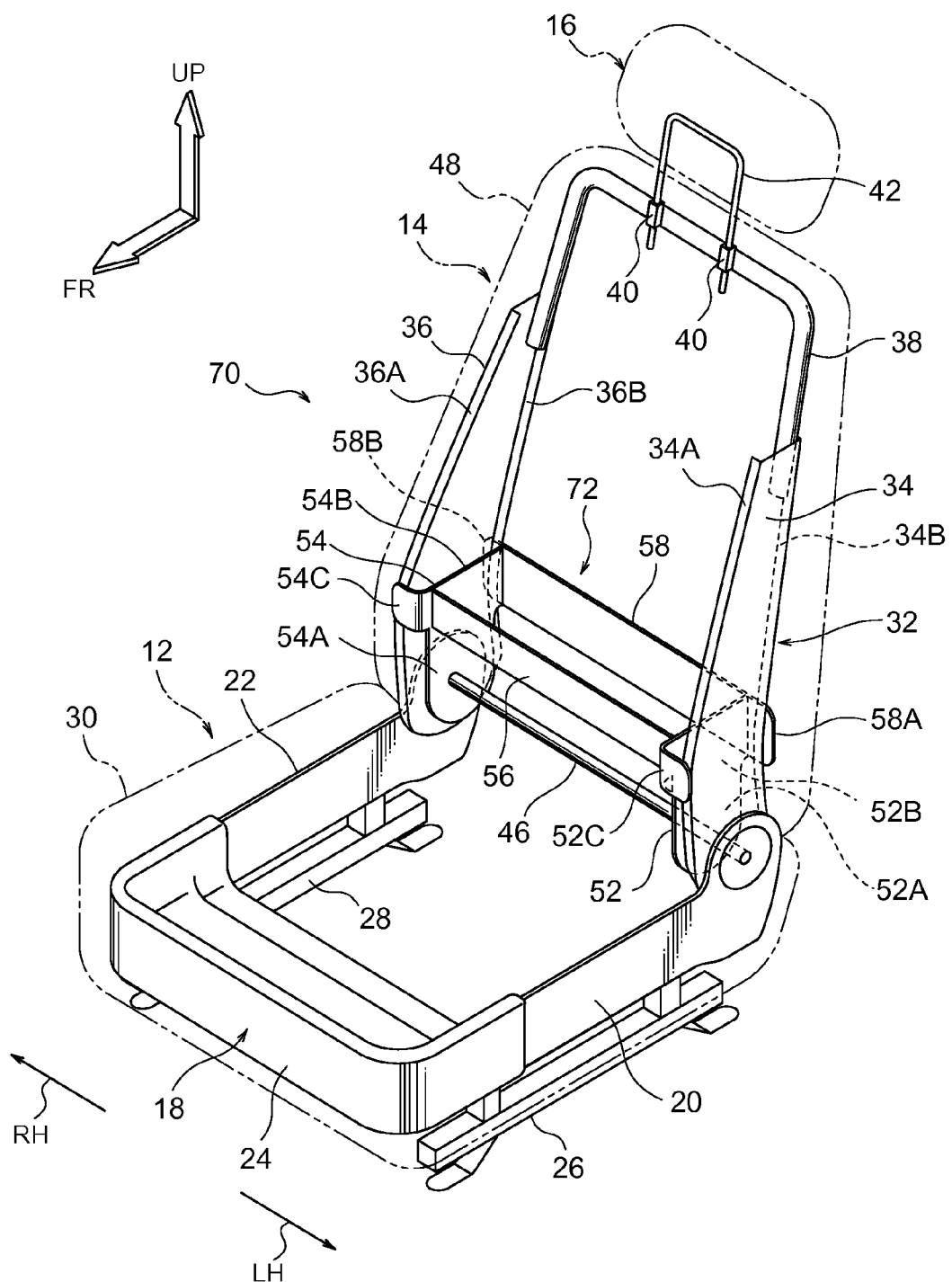
FIG. 12 is a perspective diagram illustrating structure of a frame of a vehicle seat relating to a third exemplary embodiment.
Figure 13:
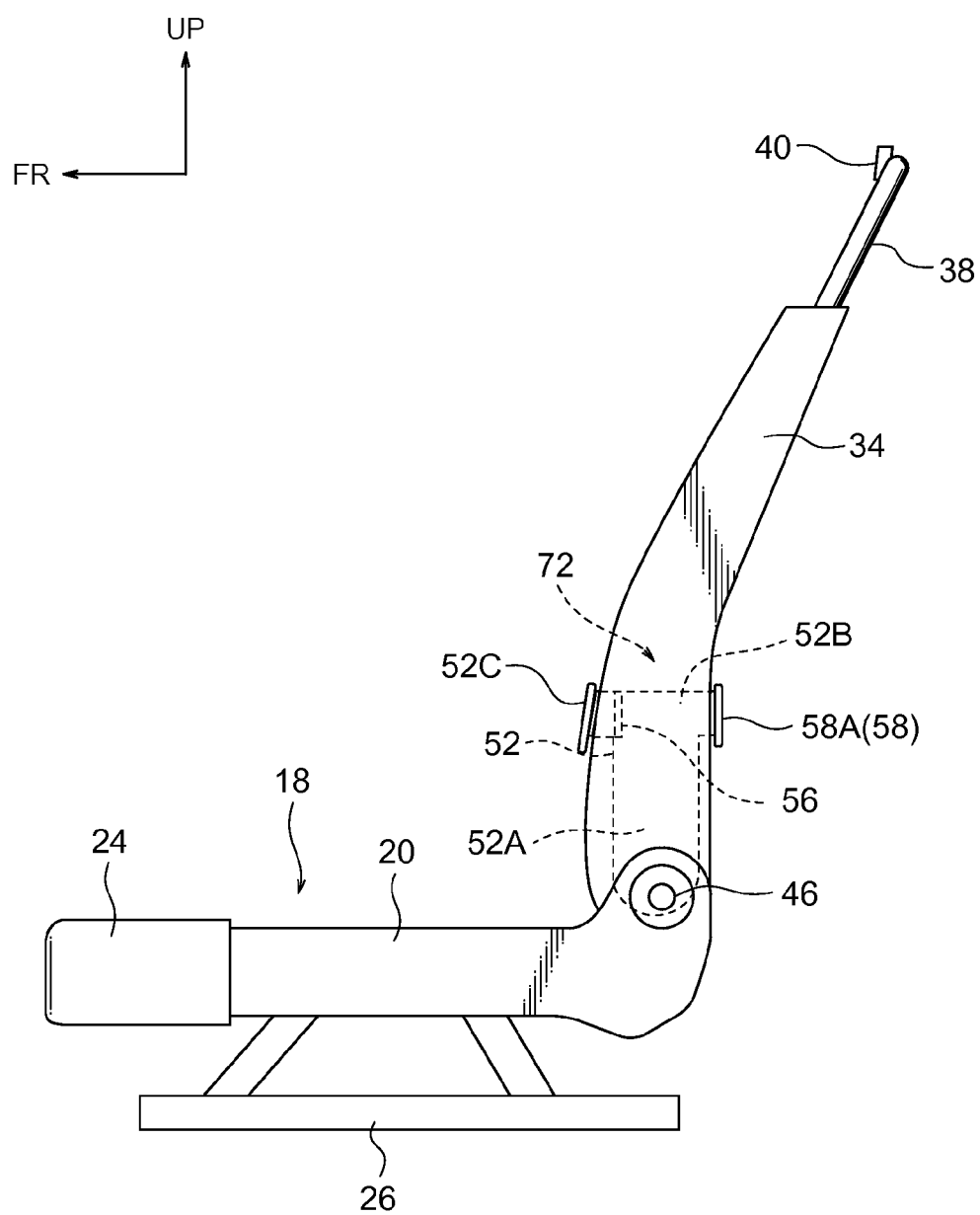
FIG. 13 is a side diagram illustrating structure of the frame illustrated in FIG. 12.
Figure 14:
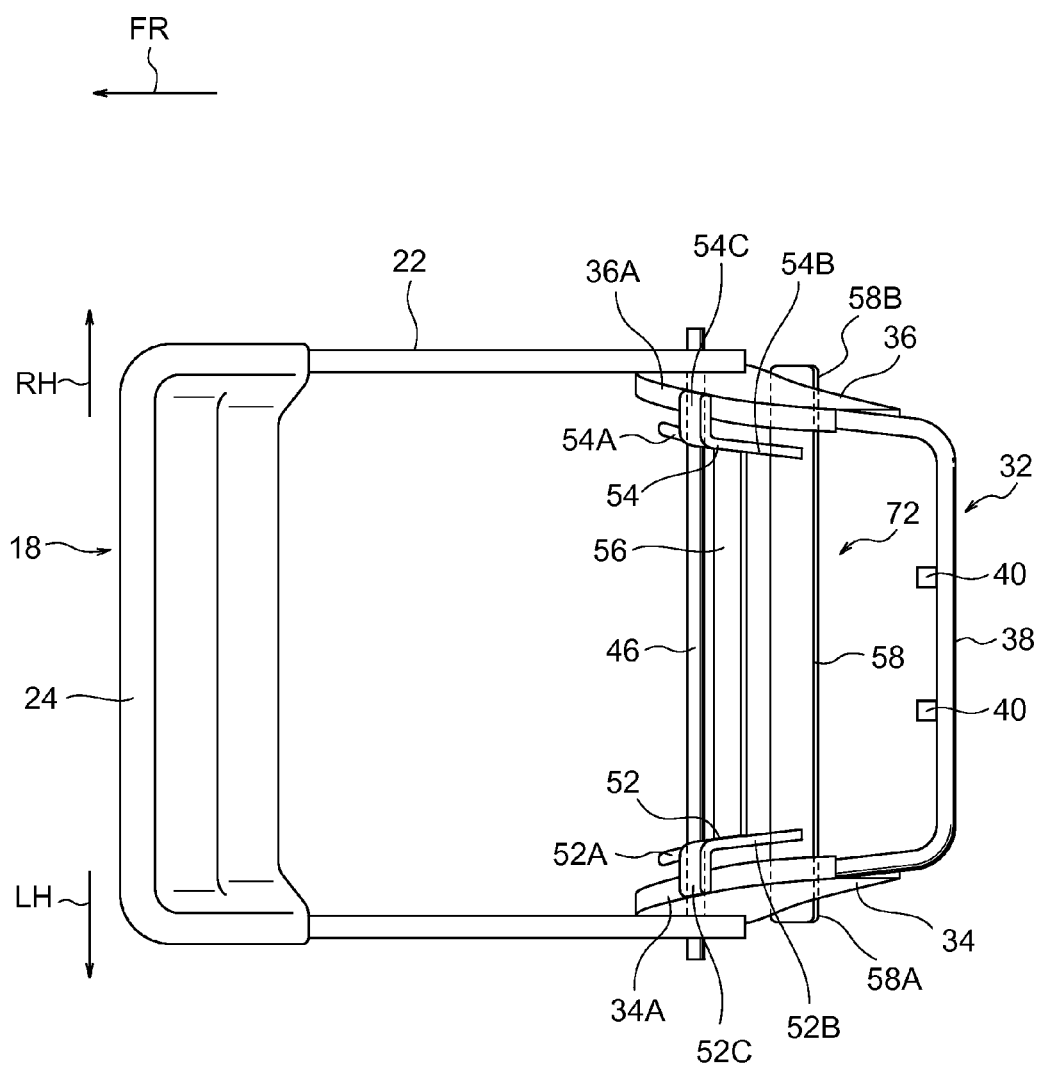
FIG. 14 is a plan diagram illustrating structure of the frame illustrated in FIG. 12.

Next, a vehicle seat 70 relating to a third exemplary embodiment of the present invention is described referring to FIG. 12 to FIG. 14. Structures and operations that are basically the same as in the first exemplary embodiment are assigned the same reference numerals as in the first exemplary embodiment, and descriptions thereof are not given.

The vehicle seat 70 relating to this exemplary embodiment has basically the same structure as the vehicle seat 10 relating to the first exemplary embodiment, but structure of a support frame 72 (the support member) differs from the support frame 50 relating to the first exemplary embodiment. This support frame 72 has a structure basically the same as the support frame 50, but front side abutting portions 52C and 54C are provided at the leg portions 52 and 54 of the support frame 72. The front side abutting portions 52C and 54C extend to the vehicle forward side from front ends of the upper portions of the main body portions 52A and 54A.

A distal end side of the front side abutting portion 52C provided at the seat left side leg portion 52 is inflected to the seat left side and disposed at the front side of the side frame portion 34. This front side abutting portion 52C opposes the side frame portion 34A of the side frame portion 34 with a predetermined gap opened therebetween. A distal end side of the front side abutting portion 54C provided at the seat right side leg portion 54 is inflected to the seat right side and disposed at the front side of the side frame portion 36. This front side abutting portion 54C opposes the front wall 36A of the side frame portion 36 with a predetermined gap opened therebetween.

—Operations and Effects of the Present Third Exemplary Embodiment—

The vehicle seat 70 with the structure described above has basically the same structure as the vehicle seat 10 relating to the first exemplary embodiment. Therefore, the same operational effects as in the first exemplary embodiment are realized. Furthermore, when, for example, there is an impact at the front face of the vehicle, the seat occupant acts to move by inertia to the vehicle forward side. When the seatback frame 32 relatively moves to the vehicle forward side with respect to the support member because a load from the seat occupant is inputted to the seatback frame 32 via a seatbelt and the like, the front walls 34A and 36A of the seatback frame 32 abut against the front side abutting portions 52C and 54C provided at the support frame 72. Thus, the seatback frame 32 is supported by the support frame 72, and deformation of the seatback frame 32 is suppressed. Therefore, the support frame 72 may act as a rigid member when there is a front face impact, and may provide the same operational effects as the vehicle seat 60 relating to the second exemplary embodiment.

Furthermore, in the vehicle seat 70, the front side abutting portions 52C and 54C are disposed to oppose the seatback frame 32 at the front side of the side frame portions 34 and 36 of the seatback frame 32, and the rear side abutting portions 58A and 58B oppose the seatback frame 32 at the rear side of the side frame portions 34 and 36 of the seatback frame 32. Therefore, when the seatback frame 32 relatively moves to the vehicle forward side and to the rearward side with respect to the support frame 72, the seatback frame 32 may be excellently abutted against these abutting portions and firmly supported. Thus, inconsistencies in the effect of the support frame 72 serving as a rigid member may be reduced.

In the above-described third exemplary embodiment, the front side abutting portions 52C and 54C of the support frame 72 (the support member) are structured to oppose the seatback frame 32 at the front side of the seatback frame 32, but the present invention is not to be limited thus. It is sufficient if they abut against the seatback frame 32 when the seatback frame 32 relatively moves to the vehicle forward side with respect to the support member.

In the exemplary embodiments described above, the support frame 50, 62 or 72 (the support member) is configured to be fixed to the reclining rod 46, but the present invention is not to be limited thus. The support member may be configured to be fixed to the side frame portions 20 and 22 or to a vehicle floor portion.

In the exemplary embodiments described above, the support frame 50, 62 or 72 (the support member) is configured to be provided with a pair of left and right leg portions 52 and 54 or the like, but the present invention is not to be limited thus. The structure of the support member may be modified as appropriate.

In other respects, the present invention may be variously modified and embodied within a technical scope not departing from the scope of the present invention. It will be clear that rights to the present invention are not to be limited to the exemplary embodiments described above.

The invention claimed is:

1. A vehicle seat for a vehicle, the vehicle seat comprising:
a seatback frame having a top portion to which a headrest is attached; and
a support member that is attached at a seat cushion frame separately from the seatback frame, and the support member is adapted to support a waist area of a seat occupant from a vehicle rearward side when there is an impact at a rear face of the vehicle,
wherein the support member is specified with a higher stiffness with respect to a load from the vehicle forward side than the seatback frame, and
the support member includes a rear side abutting portion that abuts against the seatback frame when the seatback frame relatively moves to the vehicle rearward side with respect to the support member.

2. The vehicle seat according to claim 1, wherein the rear side abutting portion is disposed to face the seatback frame at substantially both ends in a width direction of the seatback frame.

3. The vehicle seat according to claim 1, wherein the rear side abutting portion is disposed to oppose the seatback frame at the rear side of the seatback frame.

4. The vehicle seat according to claim 1, wherein the support member includes a front side abutting portion that abuts against the seatback frame if the seatback frame relatively moves to the vehicle forward side with respect to the support member.

5. The vehicle seat according to claim 4, wherein the front side abutting portion is disposed to oppose the seatback frame at the front side of the seatback frame.

6. The vehicle seat according to claim 1, wherein the support member includes a both sides abutting portion that abuts against the seatback frame if the seatback frame relatively moves to the vehicle rearward side with respect to the support member and that abuts against the seatback frame if the seatback frame relatively moves to the vehicle forward side with respect to the support member.

7. The vehicle seat according to claim 6, wherein the both sides abutting portion is inserted, in a non-contacting state, into a penetrating hole that penetrates through a side portion of the seatback frame in a seat left-right direction.

8. The vehicle seat according to claim 1, wherein the support member is fixed to a reclining rod that is disposed at a rear portion of a seat cushion, two axial direction end portions of the reclining rod being supported at the seat cushion frame.

9. The vehicle seat according to claim 8, wherein the support member includes: a pair of left and right leg portions that are disposed at left and right side portions of the seatback, lower end portions of the leg portions being fixed to axial direction end sides of the reclining rod; and an occupant support portion that connects between upper end portions of the pair of leg portions in the seat left-right direction and the occupant support portion is adapted to support the waist area of the seat occupant from the vehicle rearward side.

10. The vehicle seat according to claim 9, wherein the occupant support portion is formed in a plate shape, a plate thickness direction of which is along the front-rear direction of the seatback.

11. A vehicle seat for a vehicle, the vehicle seat comprising a contact time shortener that, without relatively moving a headrest to a vehicle forward side with respect to a seatback frame, shortens a duration from an impact at a rear face of the vehicle to a head area of a seat occupant being adapted to abut against the headrest,
wherein the contact time shortener comprises an input load reducer that reduces a load inputted to the seatback frame from the seat occupant when there is an impact at the rear face of the vehicle, and
the input load reducer includes a rear side abutting portion that abuts against the seatback frame when the seatback frame relatively moves to the vehicle rearward side with respect to the input load reducer.

12. The vehicle seat according to claim 11, wherein the contact time shortener comprises a head area turning radius reducer that reduces a turning radius of the head area of the seat occupant when there is an impact at the rear face of the vehicle.

13. The vehicle seat according to claim 11, wherein the rear side abutting portion is disposed to face the seatback frame at substantially both ends in a width direction of the seatback frame.

* * * * *